Patented May 31, 1932

1,861,058

UNITED STATES PATENT OFFICE

ERNST JAENECKE, OF HEIDELBERG, AND HERMANN KLIPPEL, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

RECOVERY OF SULPHIDES

No Drawing. Application filed May 10, 1929, Serial No. 362,124, and in Germany June 15, 1928.

The present invention relates to the production of water-soluble sulphides in a substantially pure state from mixtures containing such sulphides, for example the crude melts as they are obtained by the reduction of alkali metal sulphates with carbon at elevated temperatures.

According to the methods hitherto known, it is difficult to work up such masses. The method hitherto employed consisting in the lixiviation of the said melts with water or aqueous liquids and in the concentration of the brines obtained has the disadvantage that by lixiviation, in addition to the concentrated brines, also diluted brines are obtained in considerable quantities, which first must be converted into more concentrated brines, by employing them for the lixiviation of fresh material, before they can be worked up by evaporation for the production of solid sulphide.

We have now found that the treatment of the said masses is effected in a surprisingly simple manner by employing steam as a lixiviation agent. Owing to the fact that steam, being in a vaporous condition, penetrates into the fine pores of the material far more rapidly than water or other liquids, the process can be carried out far more rapidly than with liquids and thereby in a simple manner and in a short time highly concentrated liquid products can be obtained, containing pure alkali metal sulphide, and solidifying on cooling directly to solid products.

In the beginning of the action of the steam on the product to be worked up, the temperature of the latter rises to considerably above the temperature of the steam employed; for example when treating with steam of 142° centigrade, a crude melt, containing sodium sulphide, obtained by reduction of sodium sulphate with carbon, the temperature of the melt may rise to about 186° centigrade; thus a highly concentrated hot solution of sodium sulphide is easily obtained, which without any necessity for further treatment of the solution solidifies on cooling to a solid commercial product, containing 60 to 62 per cent of sodium sulphide. In order to obtain a product of the highest concentration possible, it has been found suitable, to preheat the masses to be lixiviated to more than 100° centigrade, preferably to about 140° to 160° centigrade.

The lixiviation of the products can be completed by a simultaneous treatment with hot water, whereby only a comparatively small amount of water is necessary. When melts of sodium sulphide are worked up, only a very small amount of a diluted brine is obtained, containing less than 30 per cent of sodium sulphide, and which therefore does not directly solidify to a solid product. From this brine the compound $Na_2S.9H_2O$ can be recovered by crystallization.

The amount of steam consumed by the process is very low, since for the transformation of the alkali metal sulphides into liquid products, especially at elevated temperature, only small amounts of water in the form of steam are necessary. Loss of heat is extremely small, due to the shortness of time, in which lixiviation can be effected, and due to the small size of the apparatus required.

In the process according to our present invention, the steam is condensed when acting on the material, and the sulphide is washed out by the action of the condensate. The steam is passed through the material to be worked up preferably from above, because the condensate then has better opportunities for dissolving the sulphide, and for being enriched therein. In order to accelerate the lixiviation process, and to economize with the steam, the mass may previously be moistened with water or a dilute solution of the sulphide in question.

After the steam has been passed through and the mass lixiviated, a stream of air or other gas may be blown through the hot residues in order to press the brines out of the apparatus.

The aforesaid process may also be carried out continuously for example by working with the aid of a worm conveyor feeding the material to be lixiviated through a long tube through which the steam is passed in a counter-current. Since the residue retains moisture, it is advisable that the same should not contain too much dissolved sulphide. For this reason it is advisable after spraying with mother liquor, and thus extracting the bulk of the dissolved sulphide to spray further with a certain amount of warm water, which pushes the concentrated brines forward in the apparatus. The process is preferably conducted in such a manner that the steam produced has only a small surplus pressure of a few millimeters of mercury and only presses the brines out of the apparatus in so far as they are concentrated, and that just that amount of sulphide separates out on cooling, as has been newly taken up by the solution. When working with a worm conveyor, this may be achieved by regulating the rate of rotation of the conveyor and the amount of mother liquor or brine sprayed into the apparatus.

Compressed air may be especially advantageously employed towards the end of the lixiviation for pressing the brines out of the apparatus.

The lixiviation can be carried out in a continuous process in a particularly advantageous manner when working with a system of containers filled with the mass to be lixiviated, steam or water being supplied to one of the containers and the resulting brines passed through the following containers, one after the other. That container in which the material is sufficiently lixiviated is always shut off from the flow of liquid, emptied, charged with fresh amounts of the crude product and again connected to the flow as the last of the series. From such last container a hot saturated solution of the sulphide in question is withdrawn from which pure sulphide is separated on cooling. The steam required for lixiviation may, as already stated, be supplied to the containers from above.

The process according to our present invention is applicable to the recovery of any water-soluble sulphide from mixtures containing the same. It is of particular advantage for the production of pure or substantially pure alkali metal sulphides, but is applicable equally well to the treatment of sulphides of the alkaline earth metals.

The following examples will further illustrate the nature of the said invention, but the invention is not restricted to these examples. The parts are by weight.

Example 1

A crude melt obtained by reduction of sodium sulphate with the aid of carbon at elevated temperature, which contains about 62 per cent of sodium sulphide, is reduced to small pieces and is lixiviated in an iron cylinder, provided with a sieve at the bottom, at first only with steam which is introduced from above, and then with hot water and steam. By the steam treatment 77 per cent of the total amount of the sodium sulphide present is recovered after a short time in the form of a liquid, completely solidifying to a solid product on cooling, containing 55 per cent of sodium sulphide; by the treatment with steam and hot water, the remaining 23 per cent is obtained in the form of a brine, containing 19 per cent of sodium sulphide.

This residual amount of sodium sulphide is recovered in the form of a liquid containing 34.5 per cent of sodium sulphide, also solidifying completely on cooling to a solid product, if the aforesaid 19 per cent sodium sulphide solution is employed instead of water as the lixiviating agent, together with steam, for a fresh batch of crude material.

Example 2

A crude melt, as referred to in Example 1, is heated to 142° centigrade, steam having the temperature of about 140° centigrade then being admitted thereto from above. In this way in a very short time 70 per cent of the total amount of the sodium sulphide present is obtained in the form of a solid product, containing 60 per cent of sodium sulphide; 25 per cent is obtained in the form of a solid product, containing, however, only 34 per cent of sodium sulphide, and 1 per cent is obtained in the form of an aqueous solution, containing 17 per cent of sodium sulphide. The balance of only 4 per cent of sodium sulphide is not removed from the initial materials when working in this manner.

Example 3

A crude melt obtained by the reduction of barium sulphate by means of carbon and containing about 70 per cent of barium sulphide is treated with steam and water in the manner hereinbefore described. A hot, concentrated solution containing about 35 per cent of barium sulphide is obtained from which, on cooling to room temperature, about 85 per cent of barium sulphide present in the crude mass separate in the form of a basic barium sulphydrate. 95 per cent of the barium sulphide present in the crude product are extracted. When the residue remaining after lixiviation is subjected to another treatment with steam and water, a solution containing 3 per cent of barium sulphide is obtained. When 98 per cent of the barium sulphide present in the crude mass are extracted, only 1 part of the dilute solution from the second lixiviation is obtained for each 3.5 parts of concentrated solution from the first treatment with steam and water.

What we claim is:—

1. The process of recovering water-soluble sulphides in a substantially pure state from mixtures containing the same, which comprises passing steam and mother liquor from a previous charge through said mixture from above.

2. The process of recovering water-soluble sulphides in a substantially pure state from mixtures containing the same, which comprises passing steam and mother liquor from a previous charge through said mixture from above and then blowing air through the hot residue.

3. The process of recovering water soluble sulphides in a substantially pure state from a mixture containing the same which comprises passing steam from above through said mixture while located in a solution zone whereby at least partial condensation of said steam is effected and a selective dissolution of said sulphides obtained and continuously withdrawing the resulting liquid as formed from said solution zone at a point adjacent the lower end of said zone.

4. The process as defined in claim 3 wherein steam and an aqueous liquid is passed from above through said mixture.

5. The process as defined in claim 3 wherein the mixtures contain an alkali metal sulphide which is to be recovered.

6. The process as defined in claim 3 wherein the sulphide recovered is sodium sulphide.

7. The process as defined in claim 3 wherein sodium sulphide is recovered from a mixture obtained by reducing sodium sulphate by means of carbon.

8. The process of recovering alkali metal sulphides in a substantially pure state from a mixture containing the same which comprises preheating said mixture to a temperature of from 140 to 160° C., passing steam from above through said mixture while located in a solution zone whereby at least partial condensation of said steam is effected and a selective dissolution of said sulphides obtained and continuously withdrawing the resulting liquid as formed from said solution zone from a point adjacent the lower end of said zone.

In testimony whereof we have hereunto set our hands.

ERNST JAENECKE.
HERMANN KLIPPEL.